(12) United States Patent
Adamey et al.

(10) Patent No.: US 9,168,925 B2
(45) Date of Patent: Oct. 27, 2015

(54) METHOD FOR ESTIMATING GRADE AND ROLLING DIRECTION

(71) Applicant: Ford Global Technologies, LLC, Dearborn, MI (US)

(72) Inventors: Emrah Adamey, Columbus, OH (US); Mathew Alan Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 14/143,230

(22) Filed: Dec. 30, 2013

(65) Prior Publication Data

US 2015/0183434 A1    Jul. 2, 2015

(51) Int. Cl.
| | |
|---|---|
| *B60W 30/18* | (2012.01) |
| *B60W 40/10* | (2012.01) |
| *B60T 7/12* | (2006.01) |
| *B60W 10/06* | (2006.01) |
| *B60W 10/11* | (2012.01) |
| *B60W 40/076* | (2012.01) |
| *B60W 50/00* | (2006.01) |

(52) U.S. Cl.
CPC ............ *B60W 30/18009* (2013.01); *B60T 7/12* (2013.01); *B60W 10/06* (2013.01); *B60W 10/11* (2013.01); *B60W 40/076* (2013.01); *B60W 40/10* (2013.01); *B60W 50/00* (2013.01)

(58) Field of Classification Search
CPC ..................... B60W 30/18009; B60W 10/184; B60W 10/06; G06F 17/00
USPC ..................... 701/70, 68, 42, 45; 477/77, 185
See application file for complete search history.

(56) References Cited

U.S. PATENT DOCUMENTS

| | | | |
|---|---|---|---|
| 7,702,442 B2 | 4/2010 | Takenaka | |
| 2003/0130778 A1* | 7/2003 | Hrovat et al. | ................... 701/45 |
| 2008/0133066 A1 | 6/2008 | Takenaka | |
| 2009/0048063 A1* | 2/2009 | Silveri et al. | ....................... 477/3 |
| 2010/0036564 A1* | 2/2010 | Blaise et al. | .................... 701/42 |
| 2010/0106360 A1 | 4/2010 | Lu et al. | |
| 2010/0106369 A1 | 4/2010 | Lu et al. | |
| 2010/0106376 A1 | 4/2010 | Lu et al. | |
| 2010/0318255 A1* | 12/2010 | Li et al. | ........................... 701/29 |

* cited by examiner

*Primary Examiner* — Tan Q Nguyen
(74) *Attorney, Agent, or Firm* — David Kelley; Alleman Hall McCoy Russell & Tuttle LLP

(57) ABSTRACT

Systems and methods for determining vehicle rolling direction and road grade are disclosed. In one example, a vehicle rolling direction is determined from a correlation coefficient. The vehicle rolling direction is applied to a kinematic equation to determine road grade.

20 Claims, 4 Drawing Sheets

METHOD FOR ESTIMATING GRADE AND ROLLING DIRECTION

FIELD

The present description relates to method for estimating road grade and rolling direction of a vehicle. The method may be useful for vehicles that include wheel speed sensors that are not direction specific.

BACKGROUND AND SUMMARY

Vehicles may operate on a wide variety of road surfaces to take passengers to their desired destinations. The vehicles may also be stopped and restarted at a later time on these road surfaces. For example, a vehicle may be stopped and parked on a hill so that the vehicle is directed uphill or downhill. If the hill has a high grade, the vehicle may roll uphill or downhill assisted by the grade after the engine is started when the vehicle's transmission is disengaged from park. The vehicle's driver may prevent or reduce vehicle acceleration after the transmission is disengaged from park by applying vehicle brakes. However, if the vehicle is an automatically stopped and started vehicle, applying the vehicle brakes may cause the vehicle's engine to stop when the driver is preparing to drive away since engine starting may be dependent on vehicle brake application. On the other hand, if the driver releases the brake to restart the engine, the vehicle may accelerate in a downhill direction. In this way, stopping an automatic start/stop vehicle on a hill may allow a vehicle to move when the driver simply intends for the engine to start. Therefore, it may be desirable to determine whether or not a vehicle is stopped on a hill so that mitigating actions to limit vehicle movement may be taken.

The inventors herein have recognized the above-mentioned disadvantages and have developed a method for operating a vehicle, comprising: applying or adjusting an actuator in response to a rolling direction estimated from a correlation coefficient based on an unsigned wheel speed and a sign specific vehicle longitudinal acceleration.

By adjusting an actuator in response to a vehicle rolling direction and/or road grade, it may be possible to mitigate the possibility of vehicle motion during automatic engine starting. Further, system cost may be reduced when unsigned wheel speed sensors are a basis for determining vehicle rolling direction and road grade. For example, if there is observed a positive correlation between not sign specific wheel speed based vehicle acceleration and sign specific accelerometer (e.g., an accelerometer output that includes a sign) based vehicle acceleration, it may be determined that the vehicle is rolling in a forward direction. If a negative correlation between not sign specific wheel speed based vehicle acceleration and sign specific accelerometer based vehicle acceleration is established, it may be determined that the vehicle is rolling in a reverse or backward direction. The rolling direction may be input into a kinematic equation to establish road grade, and the road grade may allow actuators to adjust engine torque and vehicle brakes to compensate for gravitational forces.

The present description may provide several advantages. Specifically, the approach may allow an engine to be automatically started without causing the vehicle to move when the vehicle is stopped on a hill. Further, the approach may provide rolling direction and road grade without having to use signed wheel speed sensors, thereby reducing system cost. Further still, the approach may allow engine torque actuators to be adjusted to a level to oppose gravitational forces without producing unnecessary engine torque.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
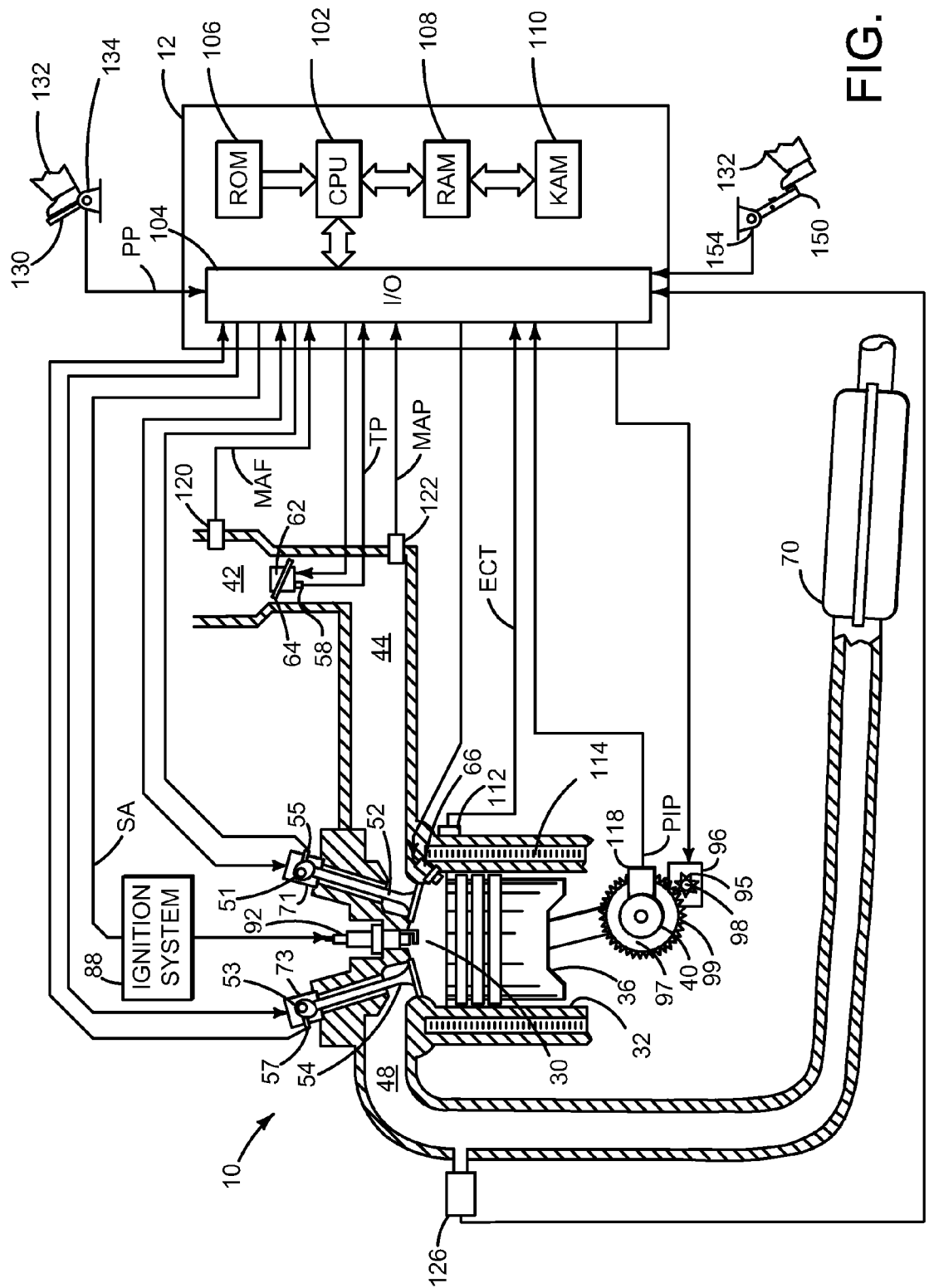
FIG. 1 shows an example engine of a vehicle.
Figure 2:
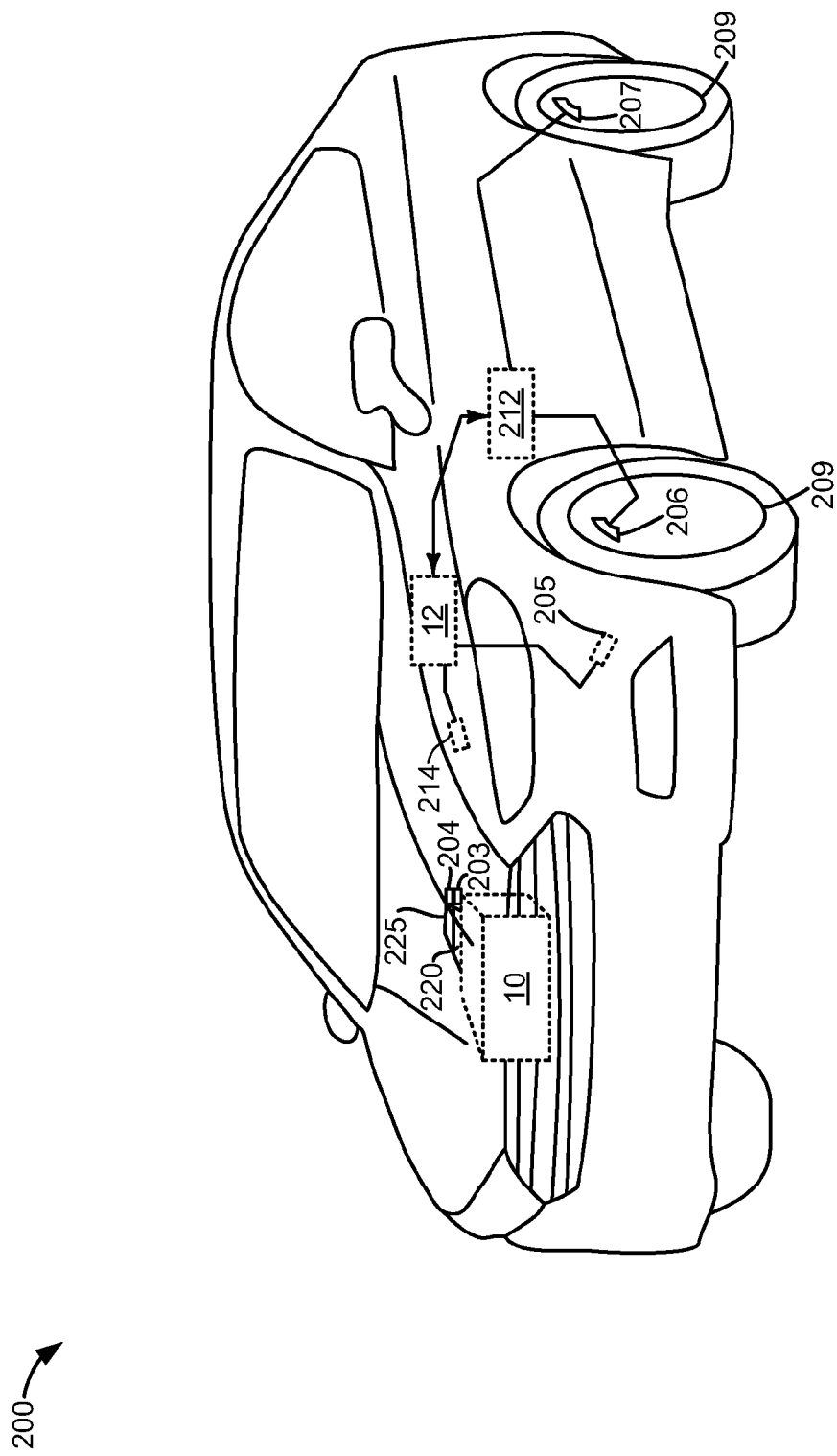
FIG. 2 shows an example vehicle in which the engine operates.
Figure 3:
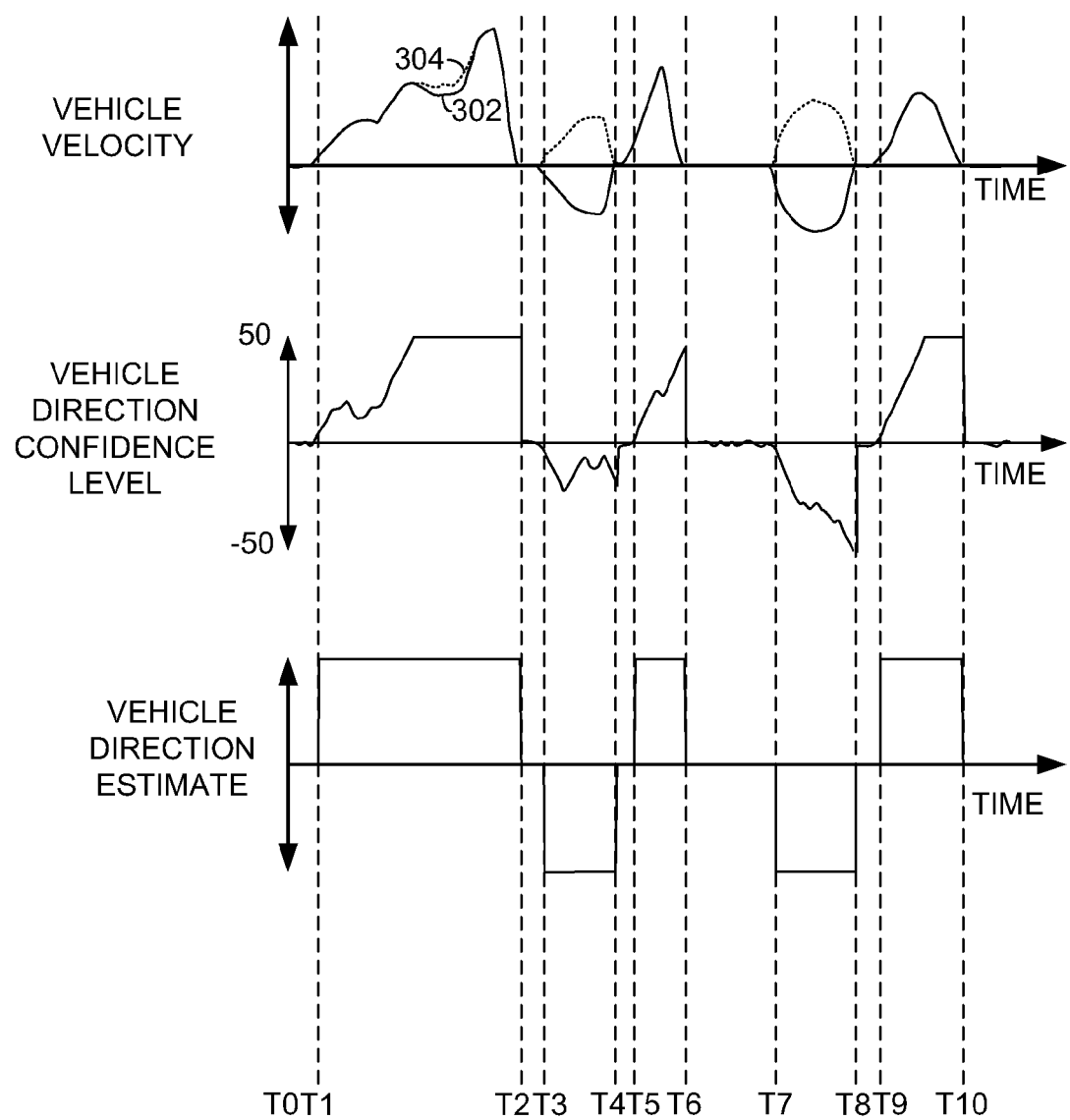
FIG. 3 shows an example vehicle operating sequence.
Figure 4:
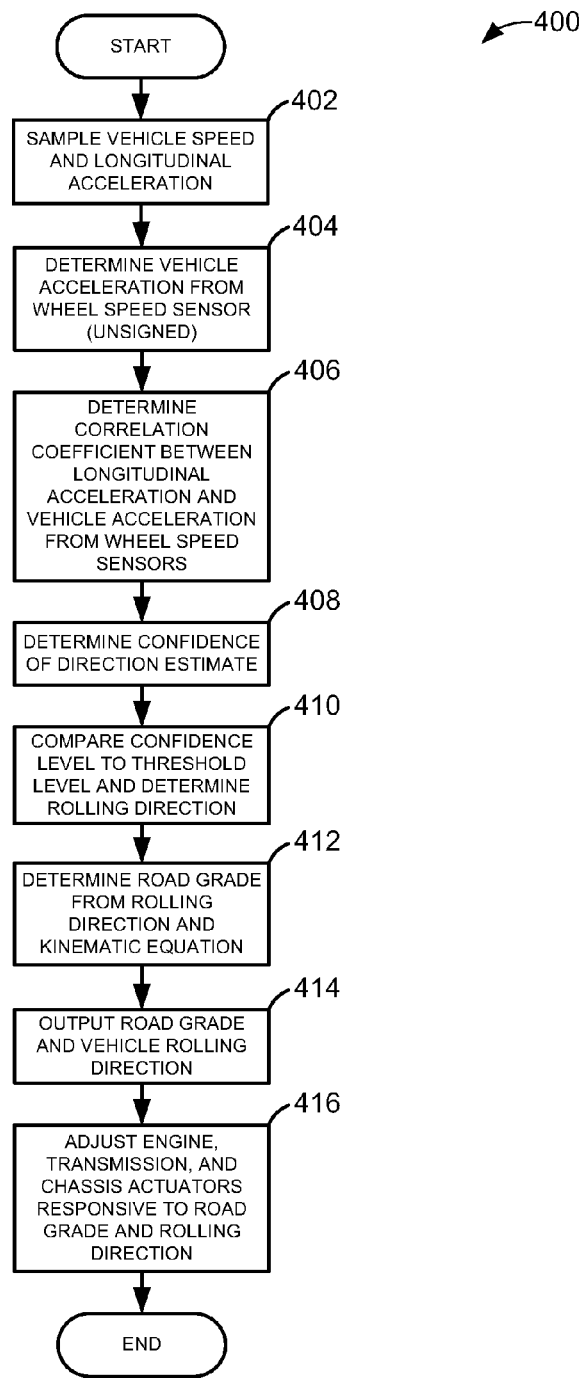
FIG. 4 shows an example method for estimating road grade and vehicle rolling direction.

The present description is related to estimating road grade and vehicle rolling direction for improving vehicle operation. The vehicle may be a passenger vehicle as shown in FIG. 2 or a commercial vehicle. The vehicle may include an engine as shown in FIG. 1. The engine may be automatically stopped and started to conserve fuel. FIG. 3 shows an example operating sequence for the vehicle where vehicle rolling direction is determined. Finally, FIG. 4 is a flowchart of a method for operating a vehicle where road grade and rolling direction are determined. The method includes adjusting various vehicle actuators in response to road grade and/or vehicle rolling direction.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Starter 96 may be automatically engaged to start engine 10 without a driver activating a device that has a sole function of starting/stopping the engine (e.g., an ignition switch).

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40 via valve adjusting mechanisms 71 and 73. Valve adjusting mechanisms 71 and 73 may also deactivate intake and/or exhaust valves in closed positions so that intake valve 52 and exhaust valve 54 remain closed during a cylinder cycle.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring to FIG. 2, an example vehicle 200 that includes engine 10 is shown. Engine 10 is shown coupled to torque converter 220 and transmission 225. A plurality of transmission gears 203 may be included with transmission 225 and applied via a plurality of transmission clutches 204. Engine 10 may be automatically started without driver input to a device (e.g., an ignition switch) that has a sole function or purpose for starting engine 10. Vehicle 200 also includes unsigned wheel speed sensors (e.g., speed sensors that do not indicate direction) 205 and a longitudinal accelerometer 214. Vehicle 200 also includes wheel brake actuators 206 that apply friction brakes to wheels 209 so that vehicle 200 may be slowed or stopped. Brake actuators 206 may be applied via brake control module 212 in response to application of brake pedal 150 or vehicle operating conditions such as road grade and vehicle operating state. Brake control module 212 may also apply electric parking brake 207 in response to vehicle operating conditions. Brake control module 212 may communicate with controller 12, or alternatively, controller 212 may operate brake actuators 206.

Thus, the system of FIGS. 2 and 3 provides for a vehicle system, comprising: an accelerometer; a wheel speed sensor; and a controller including executable instructions stored in non-transitory memory for adjusting an actuator in response to a road grade estimate determined from a correlation coefficient derived from vehicle acceleration indicated via the accelerometer and vehicle acceleration as determined via the wheel speed sensor. The vehicle system further comprises additional executable instructions for adjusting an engine torque actuator in response to the road grade estimate. The vehicle system further comprises additional executable instructions to adjust the road grade estimate responsive to variance of the road grade estimate.

In some examples, the vehicle system further comprises additional executable instructions to determine a confidence level of a rolling direction based on the correlation coefficient. The vehicle system further comprises additional executable instructions to compare the confidence level to a threshold level of confidence. The vehicle system further comprises additional executable instructions to select a sign of a rolling direction in response to the confidence level exceeding the threshold level of confidence.

Referring now to FIG. 3, an example operating sequence that shows signals of interest when vehicle rolling direction is estimated or determined. The operating sequence may be provided by the method of FIG. 4 operating with the system shown in FIGS. 1 and 2. Once vehicle rolling direction is estimated or determined, it may be passed to vehicle systems that apply vehicle brakes, adjust engine torque, and select transmission gears. Vertical markers T0-T10 represent times of interest in the sequence.

The first plot from the top of FIG. 3 is a plot of vehicle velocity versus time. The X axis represents time and time increases from the left side of FIG. 3 to the right side of FIG. 3. The Y axis represents vehicle velocity. Vehicle velocity is positive (e.g., forward) and increases in the direction of the Y axis arrow above the X axis. Vehicle velocity is negative (e.g., backwards) and increases in the direction of the Y axis arrow below the X axis. Solid line 302 represents true signed vehicle velocity as a reference for description of the method, and it indicates forward vehicle motion when it is above the X axis and it represents reverse vehicle motion when it is below the X axis. Dashed line 304 represents vehicle velocity as output from wheel speed sensors. Dashed line 304 is the same value as solid line 302 when dashed line 304 is not visible. Dashed line 304 is shown as always being positive since wheel speed sensor output is unsigned.

The second plot from the top of FIG. 3 is a plot of vehicle direction confidence level versus time. The X axis represents time and time increases from the left side of the figure to the right side of the figure. The Y axis represents a confidence level in the vehicle direction estimate. A larger positive number indicates a higher level of confidence that the vehicle is traveling in a forward direction. A larger negative number indicates a higher level of confidence that the vehicle is traveling in a reverse direction.

The third plot from the top of FIG. 3 is a plot of a vehicle rolling direction indication variable versus time. The X axis represents time and time increases from the left side of the figure to the right side of the figure. The Y axis represents vehicle direction where −1 is reverse and +1 is forward. Thus, the vehicle is estimated to be traveling in a forward direction when the vehicle direction estimate variable trace is positive and above the X axis. The vehicle is estimated to be traveling in a reverse direction when the vehicle direction estimate variable trace is negative and below the X axis.

At time T0, the vehicle velocity is zero indicating that the vehicle is not moving. The vehicle direction estimate is also indicating zero to indicate that the vehicle is not going forward or reverse. The direction confidence level is zero since the vehicle is not moving.

At time T1, the vehicle begins to accelerate in a forward direction in response to driver demand torque (not shown) or a force of gravity while the vehicle is pointed down hill. The vehicle velocity according to the method of FIG. 4 (e.g., 302) is increasing in a forward direction. The vehicle velocity according to the wheel speed sensor also increases in the positive direction. The vehicle direction according to the method of FIG. 4 is forward as indicated by the vehicle direction estimate. The vehicle direction confidence level begins at a lower value and increases as the vehicle continues to move.

At time T2, the vehicle stops and the vehicle velocity reaches zero. The vehicle direction estimate changes to a value of zero to indicate that the vehicle is not moving or no direction of travel is established. The direction confidence level also goes to zero to indicate that the vehicle is not moving.

At time T3, the vehicle begins to travel in reverse. The vehicle velocity estimate from the method of FIG. 4 is negative and less than zero. The vehicle direction estimate changes from a value of zero to a value of minus one to indicate that the vehicle is traveling in reverse. The vehicle direction confidence level increases in a negative direction and is at a lower value. The driver accelerates the vehicle in reverse, or the vehicle roll backward when the vehicle is pointed uphill.

At time T4, the vehicle stops and vehicle speed goes to zero. The vehicle direction estimate goes to a value of zero to indicate that vehicle direction is indeterminate. The vehicle direction confidence level also goes to zero to indicate that there is little confidence in the present vehicle direction estimate.

At time T5, the vehicle begins to accelerate in a forward direction as indicated by vehicle velocity increasing in a positive direction. The vehicle direction estimate changes from a value of zero to a value of plus one after the method of FIG. 4 establishes a direction. The vehicle direction confidence level also begins to increase. The vehicle accelerates in a positive direction and then decelerates toward zero speed.

At time T6, the vehicle stops and the vehicle velocity is zero. The vehicle direction estimate changes from a value of plus one to zero to indicate that the vehicle direction is indeterminate at the present time. The vehicle direction confidence level also changes to a value of zero. The vehicle is stationary until time T7.

At time T7, the vehicle changes to a reverse direction. The vehicle speed from the wheel sensors increases in a positive direction. The vehicle speed estimate from the method of FIG. 4 increases in a negative direction. The vehicle direction estimate changes from a value of zero to a value of minus one to indicate the vehicle is traveling in reverse. The vehicle may travel in reverse when the vehicle's transmission is in reverse or when torque supplied to vehicle wheels is insufficient to overcome force applied to the wheel due to gravity and operating the vehicle on an incline. The vehicle first accelerates and then decelerates toward time T8.

At time T8, vehicle speed reaches zero and the vehicle velocity from the wheel speed sensors and the method of FIG. 4 converge back to a value of zero as the vehicle is stopped. The vehicle direction estimate also transitions from a value of minus one to a value of one. The vehicle direction confidence level returns to zero to indicate that vehicle direction is presently indeterminate. The vehicle does not move for a short period of time.

At time T9, the vehicle accelerates for a last time in response to driver demand torque (not shown). The vehicle travels in a forward direction and accelerates as indicated by the vehicle velocity signal. The vehicle velocity from the wheel sensor signal is at the same level as the vehicle velocity from the method of FIG. 4. The vehicle direction estimate transitions to a value of one to indicate travel in a forward direction. The vehicle direction confidence level increases as the vehicle accelerates. The vehicle accelerates for a short period of time and then decelerates.

At time T10 vehicle velocity is reduced to zero and the vehicle direction estimate transitions from a value of one to a value of zero. The vehicle direction confidence level also decreases to zero to indicate that the vehicle direction is indeterminate.

Thus, the vehicle velocity changes sign as the vehicle direction estimate changes sign. The specific way that vehicle direction is determined is described in the method of FIG. 4. Further, it may be observed that the vehicle direction confidence level increases as traveling distance increases.

Referring now to FIG. 4, a method for estimating road grade and vehicle rolling direction is shown. The method of FIG. 4 may be included in the system of FIGS. 1 and 2 as executable instructions store in non-transitory memory. Additionally, the method of FIG. 4 may provide vehicle direction as shown in FIG. 3.

At 402, method 400 samples vehicle speed via wheel speed sensors to determine vehicle speed and vehicle longitudinal acceleration via an accelerometer to determine vehicle acceleration. The wheel speed and accelerometer sensor outputs may be input into a controller where they may be counted transitions of a digital signal, sampled as analog signals, or processed in other known ways. The wheel speed sensors and accelerometer may be sampled several times over the course of one or more seconds to provide a plurality of wheel speed sensor based vehicle speed values and vehicle acceleration values. Method 400 proceeds to 402 after a plurality of vehicle speed values and acceleration values are determined.

At 404, method 400 determines vehicle acceleration from wheel speed vehicle velocity values. In one example, method 400 determines wheel speed sensor based vehicle acceleration by determining the derivative of vehicle speed. For example, method 400 determines a difference between two adjacent vehicle speed values and divides the difference by the time between samples to determine vehicle acceleration, temporarily assuming forward rolling direction, based on the wheel speed sensor output. The accelerometer acceleration values and wheel speed based acceleration values may be expressed as column vectors:

$$a_{t|t-1}=[a_t \ldots a_{t-1}]^T$$

$$\dot{v}_{t|t-1}=[\dot{v}_t \ldots \dot{v}_{t-1}]^T$$

where $a_{t|t-1}$ is an array of the sampled accelerometer acceleration values from time t to time t−1, and where $\dot{v}$ is an array of sampled wheel speed based vehicle acceleration values from time t to time t−1. Method 400 proceeds to 406 after vehicle acceleration based on wheel speed values is determined.

At 406, method 400 determines a correlation coefficient between the accelerometer acceleration values and the wheel speed vehicle acceleration values. The correlation coefficient may be determined from the following equations:

$$SS_{xy} \equiv \sum (x_i - \bar{x})(y_i - \bar{y})$$
$$= \sum (x_i y_i - \bar{x} y_i - x_i \bar{y} + \bar{x}\bar{y})$$
$$= \sum xy - n\bar{x}\bar{y} - n\bar{x}\bar{y} + n\bar{x}\bar{y}$$
$$= \sum xy - n\bar{x}\bar{y}$$

Substituting x=a and y=$\dot{v}$ and letting $L_{t|t-1}=SS_{xy}$ provides:

$$L_{t|t-1}=\text{corrcoef}(a_{t|t-1}, \dot{v}_{t|t-1});$$

$$L_{t|t-1} \in [-1,1]$$

When the correlation coefficient is positive, the correlation coefficient is interpreted to indicate that the vehicle is rolling in a forward direction. When the correlation coefficient is zero, the correlation is not defined and vehicle rolling direction is indeterminate. Finally, when the correlation coefficient is negative, the correlation coefficient is interpreted to indicate that the vehicle is rolling in a backward or reverse direction. Method 400 proceeds to 408 after the correlation coefficient is determined.

At 408, method 400 determines a confidence of the vehicle direction estimate. In one example, method 400 applies an iterative Bayesian filter of the form:

$$D_t = D_{t-1} + L_{t|t-1}$$

$$D_t \in [-D_{max}, D_{max}]$$

The Bayesian filter is a way to judge confidence in a rolling direction over a period of time which corresponds to a rolling distance. The confidence level may increase or decrease depending on the correlation between the accelerometer based vehicle acceleration and the wheel speed sensor acceleration. The filter accumulates values of the correlation coefficient. Method 400 proceeds to 410 after the confidence level of the direction is determined.

At 410, method 400 compares the confidence level to a threshold level to indicate the vehicle's rolling direction. In particular, the rolling sign $s_v$ (e.g., plus or minus) is determined according to the following conditions:

$$s_v = \begin{cases} +1 & D_t > D_{threshold} \\ -1 & D_t < -D_{threshold} \\ 0 & \text{otherwise} \end{cases}$$

Thus, the direction is established when the confidence level exceeds a threshold level. If the correlation coefficient changes sign, the confidence filter is reset to zero before counting resumes. Method 400 proceeds to 412 after the rolling direction is determined.

At 412, method 400 determines the road grade from the rolling direction and a kinematic equation. The following equation describes the relationship between accelerometer based vehicle acceleration a, grade acceleration g sin α, and wheel speed based acceleration $s_v \dot{v}$:

$$a = s_v \dot{v} + g \sin \alpha$$

where a is the accelerometer based vehicle acceleration, $s_v$ is the rolling direction sign, $\dot{v}$ is the wheel speed based vehicle acceleration, g is the gravitational constant, and α is the road angle. Road grade acceleration φ is determined from the equation:

$$\phi_{t|t-1} = a_{t|t-1} - s_v \dot{v}_{t|t-1}$$

The accelerometer and wheel speed signals may include noise during some conditions, and therefore, the grade estimate may be updated only in an amount proportionate to the quality of the instantaneous data. The measurement may be inversely weighted by its variance to update a recent past grade estimate.

$$\phi_t^{inst} = \text{mean}(a_{t|t-1} - s_v \dot{v}_{t|t-1})$$

$$p_t^{inst} = \text{variance}(a_{t|t-1} - s_v \dot{v}_{t|t-1})$$

The variance may be determined via:

$$SS_{xy} \equiv \sum (x_i - \bar{x})^2$$
$$= \sum x^2 - 2\bar{x} \sum x + \sum \bar{x}^2$$
$$= \sum x^2 - 2n\bar{x}^2 + n\bar{x}^2$$
$$= \sum x^2 - n\bar{x}^2$$

where $x_i$ is a measurement i within the window, and $\bar{x}$ is the mean of x. The variance $p_t^{inst}$ of the most recent time window t and that of the recent past window $p_{t-1}^{inst}$ can be used with the correlation intersection to update the grade estimate as follows:

$$\omega = \frac{p_t^{inst}}{p_t^{inst} + p_{t-1}^{est}}$$

$$\frac{1}{p_t^{est}} = \frac{\omega}{p_{t-1}^{est}} + \frac{1-\omega}{p_t^{inst}}$$

$$\frac{\varphi_t^{est}}{p_t^{est}} = \omega \frac{\varphi_{t-1}^{est}}{p_{t-1}^{est}} + (1-\omega) \frac{\varphi_t^{inst}}{p_t^{inst}}$$

The latest grade update may be adjusted this way such that the mean of a group of measurements taken over a time window is heavily weighted when the variance over the same time window is small. The group of measurements taken over a time window is lightly weighted when the variance is large. In this way, the grade estimate near zero vehicle speed where the variance is high may be continuously updated without creating large changes to the grade estimate. Method 400 proceeds to 414 after the grade estimate is updated.

At 414, method 400 outputs the road grade estimate and rolling direction to vehicle systems that utilizes road grade and rolling direction. The road grade estimate and rolling direction may be output over a CAN bus or other communication link. Method 400 proceeds to 416 after road grade and rolling direction are output.

At 416, method 400 adjusts vehicle actuators responsive to road grade and rolling direction. Actuators that may be adjusted responsive to road grad and rolling direction may include but are not limited to engine actuators, transmission actuators, and chassis actuators.

In one example, an engine torque actuator such as a throttle, cam position actuator, spark timing, or fuel injector is adjusted responsive to engine grade after the engine is automatically started to increase engine torque so that the vehicle stays stationary or rolls slowly uphill after an automatic engine start. Likewise, the torque actuator may be adjusted to decrease engine torque if the vehicle is directed downhill so that vehicle speed may be limited. The amount of adjustment to the engine torque actuator may be based on the amount of road grade and the direction the vehicle rolls.

In another example, a transmission actuator such as one or more gear clutches may be adjusted responsive to road grade and rolling direction. In particular, during engine starting, the transmission may be shifted to a gear that is based on the road grade. If the vehicle is on a steeper grade when the engine is automatically started with the transmission in gear, the transmission may be downshifted to first gear. If the vehicle is on a shallower grade when the engine is automatically started with the transmission in gear, the transmission may be shifted to second gear in response to the lower grade.

Vehicle chassis actuators may also be adjusted in response to road grade and vehicle rolling direction. For example, method 400 may apply an amount of pressure to wheel brakes that is responsive to road grade. If the road grade is higher or steeper, the hydraulic pressure applied to the wheel brakes is increased to a higher level. If the road grade is lower or less steep, the hydraulic pressure applied to the wheel brakes is decreased to a lower level. Additionally, a greater application force may be applied to an electric parking brake at higher grade amounts. Similarly, a lesser application force may be applied to the electric parking brake at lower grade amounts. Method 400 proceeds to exit after vehicle actuators are adjusted in response to road grade and rolling direction.

Thus, the method of FIG. 4 provides for operating a vehicle, comprising: applying or adjusting an actuator in response to a rolling direction estimated from a correlation coefficient based on an unsigned wheel speed and a vehicle longitudinal acceleration. The method includes where the actuator is an engine throttle. The method includes where the actuator is a fuel injector. The method also includes where the actuator is a spark advance adjusting device.

In some examples, the method further comprises decreasing torque output of an engine via the actuator in response to the rolling direction being downhill. The method further comprises increasing torque output of an engine via the actuator in response to the rolling direction being uphill. The method also further comprises determining vehicle acceleration from the unsigned wheel speed, and where the correlation coefficient is derived from vehicle acceleration from the unsigned wheel speed and the vehicle longitudinal acceleration.

The method of FIG. 4 also provides for a method for operating a vehicle, comprising: applying or adjusting an actuator in response to a grade estimate, the grade estimate based on a kinematic equation and rolling direction estimated from a correlation coefficient based on an unsigned wheel speed and a vehicle longitudinal acceleration. The method includes where the actuator is a vehicle brake. The method includes where the actuator is a transmission gear clutch. The method includes where the actuator is an engine torque actuator. The method includes where the grade estimate is further adjusted based on a variance of the grade estimate. The method further comprises determining a vehicle rolling direction via the correlation coefficient. The method further comprises determining a confidence level of vehicle rolling direction.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, full electric or partially electric driven powertrains could use the present description to advantage.

The invention claimed is:

1. A method for operating a vehicle, comprising:
   adjusting an actuator in response to a rolling direction estimated from a correlation coefficient, where the correlation coefficient is a summation of unsigned wheel speed values and vehicle longitudinal acceleration values.

2. The method of claim 1, where the actuator is an engine throttle, and where the correlation coefficient is further based on a difference between an unsigned wheel speed value and a mean unsigned wheel speed.

3. The method of claim 1, where the actuator is a fuel injector, and where the correlation coefficient is further based on a difference between a vehicle longitudinal value and a mean vehicle longitudinal acceleration value.

4. The method of claim 1, where the actuator is a spark advance adjusting device.

5. The method of claim 1, further comprising decreasing torque output of an engine via the actuator in response to the rolling direction being downhill.

6. The method of claim 1, further comprising increasing torque output of an engine via the actuator in response to the rolling direction being uphill.

7. The method of claim 1, further comprising filtering values of the correlation coefficient and determining a confidence level of a vehicle direction estimate from the filtered values of the correlation coefficient.

8. A method for operating a vehicle, comprising:
adjusting an actuator in response to a grade estimate, the grade estimate based on a kinematic equation and rolling direction estimated from a correlation coefficient based on an unsigned wheel speed and a vehicle longitudinal acceleration, and where the kinematic equation describes a relationship between accelerometer based vehicle acceleration, grade acceleration, and wheel speed based acceleration.

9. The method of claim 8, where the actuator is a vehicle brake, where the correlation coefficient is a summation of unsigned wheel speed values and vehicle longitudinal acceleration values.

10. The method of claim 8, where the actuator is a transmission gear clutch, and further comprising filtering values of the correlation coefficient and determining a confidence level of a vehicle direction estimate from the filtered values of the correlation coefficient.

11. The method of claim 8, where the actuator is an engine torque actuator.

12. The method of claim 8, where the grade estimate is further adjusted based on a variance of the grade estimate.

13. The method of claim 8, further comprising determining a vehicle rolling direction via the correlation coefficient.

14. The method of claim 13, further comprising determining a confidence level of the vehicle rolling direction.

15. A vehicle system, comprising:
an accelerometer;
a wheel speed sensor; and
a controller including executable instructions stored in non-transitory memory for adjusting an actuator in response to a road grade estimate determined from a correlation coefficient derived from a summation of vehicle acceleration indicated via the accelerometer and vehicle acceleration as determined via the wheel speed sensor.

16. The vehicle system of claim 15, further comprising additional executable instructions for adjusting an engine torque actuator in response to the road grade estimate, and where the summation includes summing a difference between mean vehicle acceleration and vehicle acceleration indicated via the accelerometer.

17. The vehicle system of claim 15, further comprising additional executable instructions to adjust the road grade estimate responsive to variance of the road grade estimate, and where the summation includes summing a difference between mean vehicle acceleration and vehicle acceleration determined via the wheel speed sensor.

18. The vehicle system of claim 15, further comprising additional executable instructions to determine a confidence level of a rolling direction based on filtering the correlation coefficient.

19. The vehicle system of claim 18, further comprising additional executable instructions to compare the confidence level to a threshold level of confidence.

20. The vehicle system of claim 19, further comprising additional executable instructions to select a sign of the rolling direction in response to the confidence level exceeding the threshold level of confidence.

* * * * *